(12) United States Patent
Grutter et al.

(10) Patent No.: US 10,137,775 B2
(45) Date of Patent: Nov. 27, 2018

(54) VEHICLE ALL-WHEEL DRIVE CONTROL SYSTEM

(71) Applicant: FORD GLOBAL TECHNOLOGIES, LLC, Dearborn, MI (US)

(72) Inventors: Peter John Grutter, Dearborn, MI (US); Vladimir Ivanovic, Canton, MI (US); Paul Moubarak, Redford Township, MI (US); Andreas Evangelos Perakes, Canton, MI (US); Nicholas Edward McCubbin, Northville, MI (US); Abhinav Kumar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 15/331,430

(22) Filed: Oct. 21, 2016

(65) Prior Publication Data

US 2018/0111479 A1  Apr. 26, 2018

(51) Int. Cl.
| | |
|---|---|
| *B60K 23/08* | (2006.01) |
| *B60K 17/348* | (2006.01) |
| *F16D 48/06* | (2006.01) |
| *B60K 17/344* | (2006.01) |
| *B60K 17/35* | (2006.01) |

(52) U.S. Cl.
CPC ........ *B60K 23/0808* (2013.01); *B60K 17/344* (2013.01); *B60K 17/348* (2013.01); *B60K 17/35* (2013.01); *B60K 23/08* (2013.01); *F16D 48/06* (2013.01); *B60K 2023/0858* (2013.01); *B60Y 2300/429* (2013.01); *F16D 2500/10431* (2013.01); *F16D 2500/30406* (2013.01); *F16D 2500/7082* (2013.01)

(58) Field of Classification Search
CPC ................. B60K 23/0808; F16D 48/06; F16D 2500/10431; F16D 2500/30406
See application file for complete search history.

(56) References Cited

U.S. PATENT DOCUMENTS

| | | | |
|---|---|---|---|
| 7,072,756 B2 | 7/2006 | Matsuda | |
| 2004/0049332 A1* | 3/2004 | Doh | B60K 23/0808 701/69 |
| 2014/0046564 A1* | 2/2014 | Matsuno | B60K 17/3462 701/69 |
| 2015/0175148 A1 | 6/2015 | Chimner et al. | |

FOREIGN PATENT DOCUMENTS

GB        2522442 A        7/2015

* cited by examiner

*Primary Examiner* — Edwin A Young
(74) *Attorney, Agent, or Firm* — James Dottavio; Brooks Kushman P.C.

(57) ABSTRACT

A vehicle includes a driveshaft, first axle, second axle, first clutch, second clutch, and controller. The driveshaft is selectively coupled to outputs of the first and second axles by the first and second clutches, respectively. The controller is programmed to, in response to a command to reconnect the driveshaft to the outputs of the first and second axles, close the second clutch to transfer loads from the second axle to the driveshaft, adjust the slip speed of the first clutch to within a target range, and close the first clutch.

20 Claims, 4 Drawing Sheets

VEHICLE ALL-WHEEL DRIVE CONTROL SYSTEM

TECHNICAL FIELD

The present disclosure relates to control systems for all-wheel drive vehicles.

BACKGROUND

Vehicles may include all-wheel drive systems that are designed to improve vehicle maneuverability and decrease driver discomfort.

SUMMARY

A vehicle includes a driveshaft, first axle, second axle, first clutch, second clutch, and controller. The driveshaft is selectively coupled to outputs of the first and second axles by the first and second clutches, respectively. The controller is programmed to, in response to a command to reconnect the driveshaft to the outputs of the first and second axles, close the second clutch to transfer loads from the second axle to the driveshaft, adjust the slip speed of the first clutch to within a target range, and close the first clutch.

A vehicle includes a first axle, second axle, driveshaft, and controller. The first axle has a first differential and first clutch. The first differential includes first and second output shafts each coupled to one of a pair of first wheels. The second axle has a second differential and a second clutch. The second differential includes third and fourth output shafts, each coupled to one of a pair of second wheels. The second clutch is configured to decouple one of the pair of second wheels from the fourth output shaft when in an open position. The driveshaft is selectively coupled to a carrier of the first differential by the first clutch. The driveshaft is also coupled to a carrier of the second differential via a fixed gearing arrangement. The controller is programmed to, in response to a command to connect the first axle to the second axle via the driveshaft, close the second clutch to transfer loads from the second axle to the driveshaft, adjust the slip speed of the first clutch to within a target range, and close the first clutch.

A method includes, in response to a command to connect an input of a first axle to an output of a second axle via a driveshaft, closing a first clutch to couple a traction wheel to an output of the first axle, adjusting a slip speed of a second clutch disposed between the driveshaft and output of the second axle to within a target range, and closing a second clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
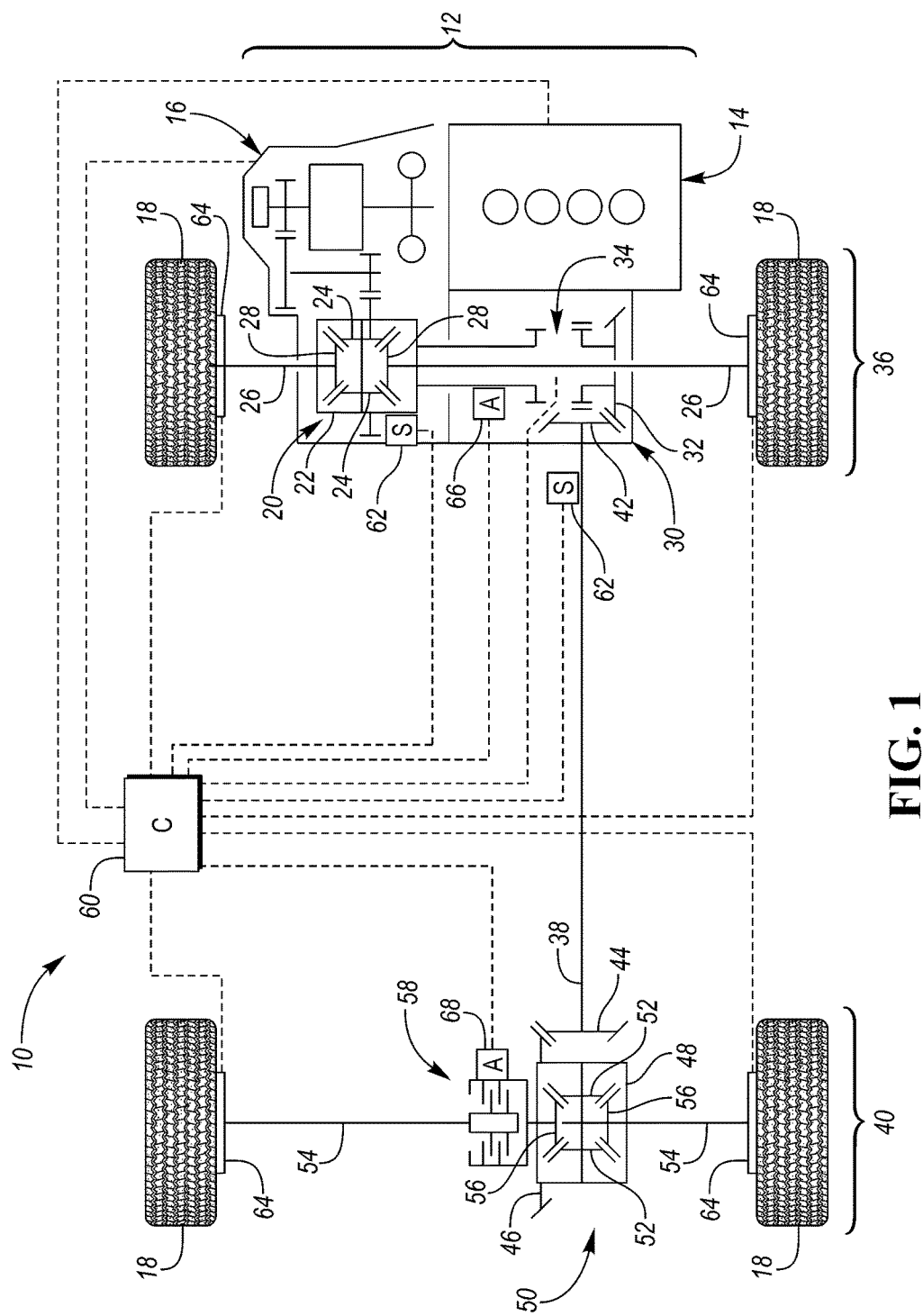
FIG. 1 is a schematic illustration of a representative vehicle and a representative vehicle powertrain.

Referring to FIG. 1, a schematic diagram representative of a vehicle 10 and a vehicle powertrain 12 is illustrated. The vehicle 10 may be an all-wheel-drive (AWD) vehicle where the powertrain 12 is capable of delivering power to all of the vehicle's wheels, whether full-time or on-demand. The powertrain 12 includes prime movers or power generating components (i.e., engines or electric motors) and the drivetrain. The drivetrain is the group of components that deliver power to the drive wheels, excluding the power generating components. In contrast, the powertrain 12 is considered to include both the power generating components and the drivetrain. The powertrain 12 includes an engine 14 and a transmission 16. The powertrain 12 may alternatively, or in addition to the engine 14, include an electric motor as a prime mover. If an electric motor is used as an alternative to the engine 14 it should be construed to perform all the functions of the engine 14 as described herein. The transmission 16 may include gearing arrangements configured to provide multiple gear ratios between an input and an output of the transmission 16. The engine 14 is connected to the input of the transmission 16 while drivetrain components that are configured to deliver power to drive wheels 18 are connected to outputs of the transmission 16. The engine 14 may be connected to the input of the transmission by a torque converter or a launch clutch.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

The transmission 16 may be a transaxle that includes both gearing elements that provide multiple gear ratios between an input and an output of the transmission 16 and a differential, which may be referred to as the front axle differential 20. The front axle differential 20 may comprise the output of the transmission 16. The front axle differential 20 includes a carrier 22, spider (or bevel) gears 24 that are rotatably coupled to the carrier 22, and output (or half) shafts 26 that include bevel gears 28 that mesh with the spider gears 24. The output shafts 26 are each fixedly coupled to a drive wheel 18. The vehicle 10 may also include a power transfer unit (PTU) 30. The PTU 30 may also be referred to as a power takeoff unit. The PTU 30 may include a ring gear 32 that is selectively coupled to the carrier 22 by power transfer unit clutch (PTU clutch) 34. The PTU clutch 34 may be a dog clutch. Collectively, the front axle differential 20 (including the carrier 22, spider gears 24, output shafts 26, bevel gears 28, etc.) and the PTU 30 (including the ring gear 32 and PTU clutch 34) may be referred to as the front axle 36. The front axle 36 may or may not also include the drive wheels 18 that are fixedly coupled to the output shafts 26. The output shafts 26 and the carrier 22 may all act as outputs of the front axle 36. The engine 14 (or other prime mover) may be configured to generate and transfer power and/or torque to the front axle 36.

A driveshaft 38 may be configured to couple the front axle 36 to a rear axle 40 (or rear drive unit). More specifically, the driveshaft 38 may include a first bevel gear 42 that meshes with the ring gear 32 in the PTU 30 and a second bevel gear 44 that meshes with a ring gear 46 that is affixed to a carrier 48 of a rear axle differential 50. The rear axle differential 50 also includes spider (or bevel) gears 52 that are rotatably coupled to the carrier 48, and output (or half) shafts 54 that include bevel gears 56 that mesh with the spider gears 52. The output shafts 54 are each fixedly coupled to a drive wheel 18. One of the half shafts 54 includes a rear drive unit (RDU) clutch 58 that is configured to couple and decouple one of the drive wheels 18 from the rear axle differential 50. Collectively, the rear axle differential 50 (including the ring gear 46, carrier 48, spider gears 52, output shafts 54, bevel gears 56, etc.) and the RDU clutch 58 may be referred to as the rear axle 40. The rear axle 40 may or may not also include the drive wheels 18 that are fixedly coupled to the output shafts 54. Collectively, the rear axle differential 50 (including the ring gear 46, carrier 48, spider gears 52, output shafts 54, bevel gears 56, etc.) and the RDU clutch 58, excluding the drive wheels 18, may be referred to as the rear drive unit (RDU). When the PTU clutch 34 and the RDU clutch 58 are both in closed positions power and/or torque that is generated by the engine 14 is transferred from the front axle 36 to the rear axle 40 via the driveshaft 38.

The front axle 36 may be referred to as the first axle while the rear axle 40 is referred to as the second axle, or vice versa. The front axle differential 20 may be referred to as the first differential while the rear axle differential 50 is referred to as the second differential, or vice versa. The carrier 20, spider gears 24, and bevel gears 28 of the front axle differential 20 may be referred to as the first carrier, first set of spider gears, and first set of bevel gears, respectively, while the carrier 48, spider gears 52, and bevel gears 56 of the rear axle differential 50 may be referred to as the second carrier, second set of spider gears, and second set of bevel gears, respectively, or vice versa. The output (or half) shafts 26 of the front axle differential 20 may be referred to as the first and second output (or half) shafts while the output (or half) shafts 54 of the rear axle differential 50 may be referred to as the third and fourth output (or half) shafts, or vice versa. The RDU clutch 58 may be referred to as the first clutch while the PTU clutch 34 may be referred to as the second clutch, or vice versa.

When the PTU clutch 34 and the RDU clutch 58 are both in open positions such that the ring gear 32 is decoupled from the carrier 22 and one of the drive wheels is decoupled from the rear axle differential 50, parasitic losses within the driveline may be decreased because specific components will cease rotating. Specifically, when the PTU clutch 34 and the RDU clutch 58 are both in open positions the ring gear 32, driveshaft 38 and carrier 48 of the rear axle differential 50 will all cease to rotate decreasing parasitic losses and increasing the overall fuel economy of the vehicle 10.

The vehicle 10 further includes an associated controller 60 such as a powertrain control unit (PCU). While illustrated as one controller, the controller 60 may be part of a larger control system and may be controlled by various other controllers throughout the vehicle 10, such as a vehicle system controller (VSC). It should therefore be understood that the controller 60 and one or more other controllers can collectively be referred to as a "controller" that controls various actuators in response to signals from various sensors to control functions of various components.

The controller 60 may be configured to receive signals indicative of the speeds of the opposing sides (input and output sides) of the PTU clutch 34. The speed differential between the opposing sides of the PTU clutch 34 may be referred to as the slip speed of the PTU clutch 34. The controller 60 may receive the signals from speed sensors 62 that are configured to determine the rotational speeds of the opposing sides of the PTU clutch 34. One speed sensor 62 may be configured to measure the speed of the driveshaft 38 while the other is configured to measure the speed of the carrier 22 the front axle differential 20 in order to determine the rotational speeds of the opposing sides of the PTU clutch 34. Alternatively, the speed sensors 62 may be located on other rotating components that are on opposing sides of the PTU clutch 34, respectively. For example, one of the speed sensors 62 may be located directly on the input of the PTU clutch 34 while the other speed sensor is located on the ring gear 32.

The controller 60 may be configured to control the power, torque, and/or speed output of the engine 14 (or other prime movers such as electric motors in electric or hybrid vehicles) based on an accelerator and/or a brake pedal input or any other state or condition that may require an adjustment of the power, torque, and/or speed output of the engine 14 (or other prime mover). The controller 60 may further be configured to control various functions of the transmission 16, such as shifting, based on various inputs including accelerator and/or brake pedal input, a regenerative braking request (in vehicles that include electric generators configured to recharge a battery), other operator inputs (such as changing the position of a transmission gear selector), etc.

The controller 60 may be configured to control friction brakes 64 (or actuators thereof) based on input from the brake pedal or another state or condition of the vehicle 10 that may require braking. Additionally, the controller 60 may be configured to control the PTU clutch 34 (or an actuator 66 of the PTU clutch) and the RDU clutch 58 (or an actuator 68 of the RDU clutch). The actuator 66 of the PTU clutch and/or the actuator 68 of the RDU clutch may be electric motors (such as servo motors), electric solenoids, valves connected to hydraulic cylinders, valves connected to pneumatic cylinders, or any other actuator known in the art. More specifically, the controller 60 maybe configured to open both the PTU clutch 34 and the RDU clutch 58 based on a need to decrease parasitic losses and increased fuel economy. Alternatively, the controller 60 may be configured to close both the PTU clutch 34 and the RDU clutch 58 based on a need to provide power to the drive wheels 18 of both the front axle 36 and rear axle 40.

The controller 60 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10.

Control logic or functions performed by the controller 60 may be represented by flow charts, graphs, or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, transmission, transaxle, and/or powertrain controller, such as controller 60. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 60 may be configured to receive various states or conditions of the various vehicle components illustrated in FIG. 1 via electrical signals. The electrical signals may be delivered to the controller 60 from the various components via input channels. Additionally, the electrical signals received from the various components may be indicative of a request or a command to change or alter a state of one or more of the respective components of the vehicle 10. The controller 60 includes output channels that are configured to deliver requests or commands (via electrical signals) to the various vehicle components. The controller 60 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described in FIG. 1 is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
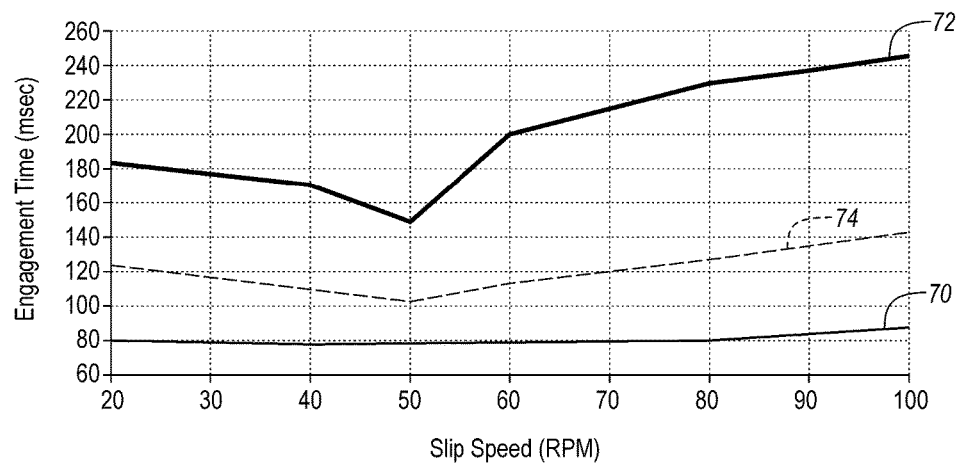
FIG. 2 is plotted data obtained from a computer simulation illustrating engagement time vs. slip speed of a power transfer unit clutch that is configured to connect/disconnect a rear axle (or rear drive unit) from the vehicle powertrain.

Referring to FIG. 2, data obtained from a computer simulation illustrates the engagement time vs. the slip speed of the PTU clutch 34 during clutch engagement. The computer simulation utilizes high fidelity modeling that simulates real-world engagement of the PTU clutch 34. The modeling data produced a minimum engagement time, maximum engagement time, and average engagement time for various slip speeds of the PTU clutch 34. The minimum engagement time for the various slip speeds of the PTU clutch 34 is illustrated as line 70. The maximum engagement time for the various slip speeds of the PTU clutch 34 is illustrated as line 72. The average engagement time for various slip speeds of the PTU clutch 34 is illustrated as line 74.

The data obtained from the high fidelity modeling predicted an increase in connection failures of the PTU clutch 34 as the slip speed of the PTU clutch 34 during an engagement increased. Connection failures of the PTU clutch 34 may include ratcheting, partial engagement traps, cogged engagements, and dog clutch jumps and skips. The data indicated that slip speeds of the PTU clutch 34 in excess of 50 RPMs may lead to an undesirable probability of connection failures of the PTU clutch 34. The data obtained from the high fidelity modeling also predicted a target range of slip speeds where the engagement time of the PTU clutch 34 is minimized. The data indicated that the engagement time of the PTU clutch 34 is minimized when the slip speed of the PTU clutch 34 ranges from 40 RPMs to 60 RPMs. Although the data indicates specific speeds where the engagement time of PTU clutch 34 is minimized and speeds where there is an undesirable probability of connection failures of the PTU clutch 34, it should be understood that the data is for exemplary purposes only and that the data may change as physical attributes (geometry, mass, force of engagement, etc.) of the PTU clutch 34 may change. For example, the engagement time where the PTU clutch 34 is minimized maybe increased or decreased as the physical attributes of the PTU clutch 34 may change based on a desired application.

In addition to the data obtained from the high fidelity modeling, real-world vehicle testing (which may be referred to as low fidelity modeling) was also performed. The real-world testing indicated that noise vibration and harshness (NVH) increased to undesirable amounts during engagements of the PTU clutch 34 above a threshold slip speed of the PTU clutch 34. The real-world testing indicated that the probability of NVH increased to undesirable amounts when the slip speed of the PTU clutch 34 was in excess of 60 RPMs. It should be understood that the data from the real-world testing is for exemplary purposes only and that the data may change as the physical attributes of the PTU clutch 34 may change based on a desired application.

Figure 3:
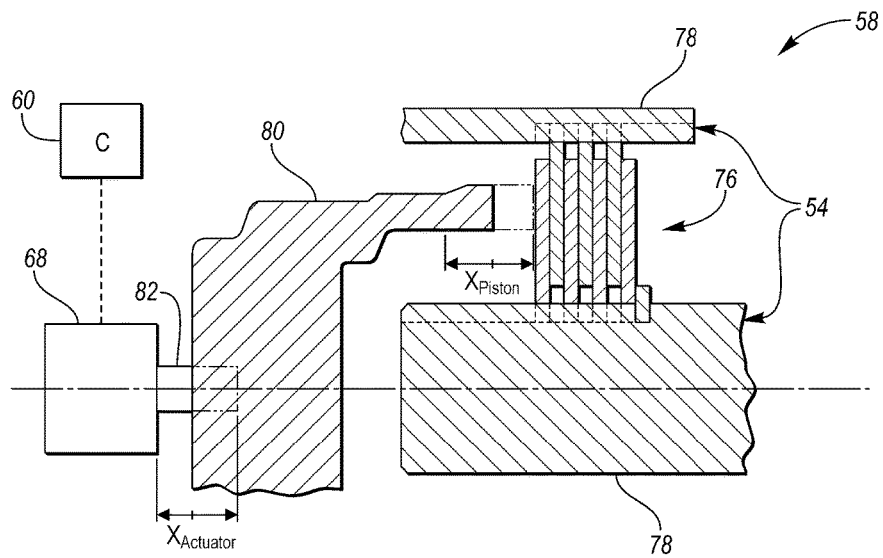
FIG. 3 is a cross-sectional view of a rear drive unit clutch.

Referring to FIG. 3, a cross-sectional view of the RDU clutch 58 is illustrated. It should be understood that FIG. 3 is meant for illustrative purposes only and that the configuration of the RDU clutch 58 may be different than what is illustrated in FIG. 3. The RDU clutch 58 may include a clutch pack 76 that is configured to couple and decouple a drive wheel 18 from the rear axle differential 50 by coupling and decoupling a pair of rotating components 78 that comprise one of the output shafts 54 of the rear axle 40. The actuator 68 of the RDU clutch 58 may be connected to piston 80 that engages the clutch pack 76 in the RDU clutch 58. The actuator 68 may be an electric motor (such as a servo motor), an electric solenoid, a valve connected to a hydraulic cylinder, a valve connected to a pneumatic cylinder, or any other actuator known in the art. The actuator 68 may include a mechanism 82 that moves the piston 80 into and out of engagement with the clutch pack 76. The mechanism 82 may produce linear movement of the piston by any method known in the art. For example, the mechanism 82 may be a sliding shaft connected to a pneumatic or hydraulic cylinder or a rotating mechanism that produces linear movement (e.g., ball nut/ball screw mechanisms). The actuator 68 may communicate the position, $X_{actuator}$, of the mechanism 82 (relative to a range of positions) and/or the position, $X_{piston}$, of the piston 80 (relative to a range of positions) to the controller 60. The position of the mechanism 82 may be communicated to the controller 60 based on an actual linear position of the mechanism 82 or based on a rotational position of an electric motor in a case where the actuator 68 is an electric motor.

Figure 4:
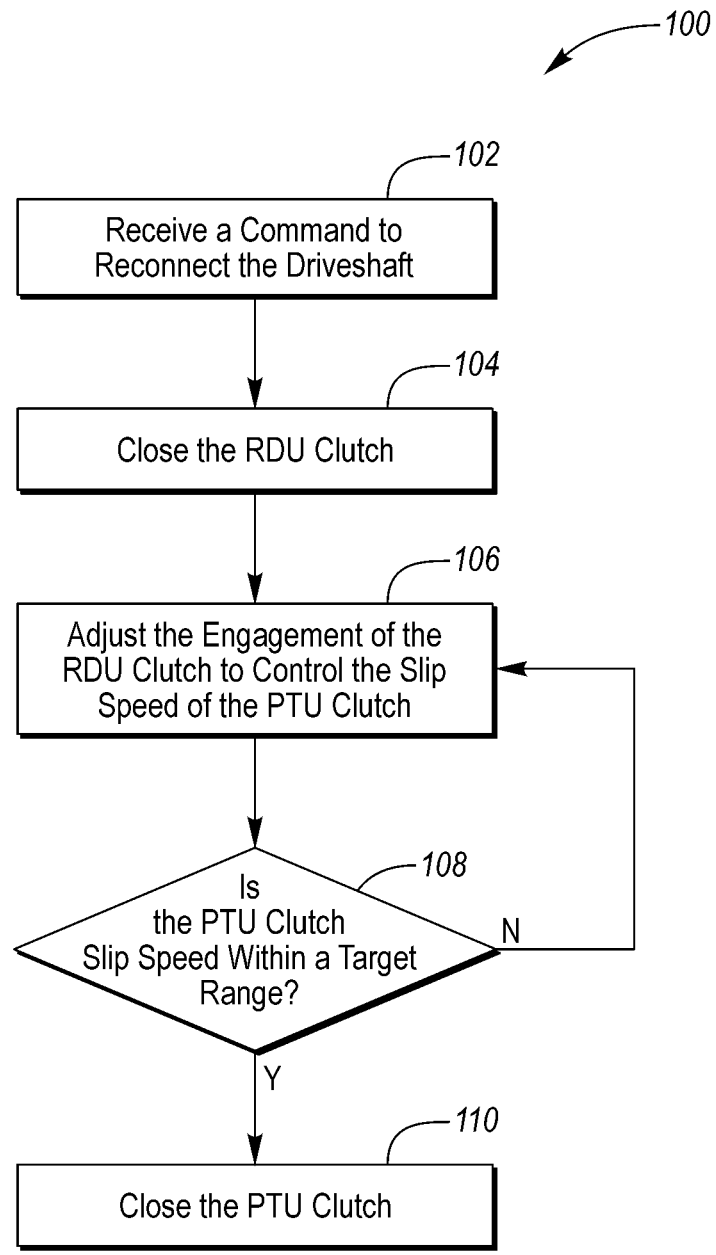
FIG. 4 is a flowchart illustrating a method of reconnecting the rear drive unit to the vehicle powertrain.

Referring to FIG. 4 a method 100 of reconnecting the rear drive unit and/or rear axle 40 to the vehicle powertrain 12 is illustrated. The method 100 may be stored as control logic and/or an algorithm within the controller 60. The controller 60 may implement the method 100 by controlling the various components of the vehicle 10. The method 100 begins at step 102 when a command is received by the controller 60 to reconnect the driveshaft 38 to the outputs of the rear axle 40 and the front axle 36. The command to reconnect the driveshaft 38 to the outputs of the rear axle 40 and the front axle 36 may be received in response to a condition requiring the vehicle 10 to transition from an energy conservation mode (where parasitic losses are reduced because the PTU clutch 34 and the RDU clutch 58 are in open positions) to an AWD mode. The condition requiring the vehicle 10 to transition to an AWD mode may be an excessive speed differential between the drive wheels 18 on the front axle 36 and the drive wheels 18 on the rear axle 40. Next, the method moves on to step 104 where the RDU clutch 58 is closed. When the RDU clutch 58 is closed, the carrier 48 of the rear axle differential 50 and the driveshaft 38 each become reconnected to the previously disconnected output shaft 54 of the rear axle differential 50. Power and torque are then transferred, via road loads, from the rear drive wheels 18 to the carrier 48 and the driveshaft 18 which each begin to rotate. The method 100 then adjusts the engagement of the RDU clutch 58 at step 106 in order to adjust the speed of the driveshaft 38 which is fixedly coupled to the output of the PTU clutch 34. The speed of the driveshaft 38 is adjusted towards a desired speed that correlates with a desired slip speed of the PTU clutch 34. The desired slip speed of the PTU clutch 34 may include the target range of slip speeds obtained from the high fidelity modeling that correlates with minimizing the engagement time of the PTU clutch 34, as described above. Next, at step 108, the method determines if the PTU clutch 34 slip speed is within the target range. If the slip speed of the PTU clutch 34 is not within the target range the method returns to step 106. If the slip speed of the PTU clutch 34 is within the target range, the method 100 moves on to step 110 where the PTU clutch 34 is closed. Once the PTU clutch 34 is closed the vehicle 10 may be in an AWD mode. It should be understood that the flowchart in FIG. 4 is for illustrative purposes only and that the method 100 should not be construed as limited to the flowchart in FIG. 4. Some of the steps of the method 100 may be rearranged while others may be omitted entirely.

Figure 5:
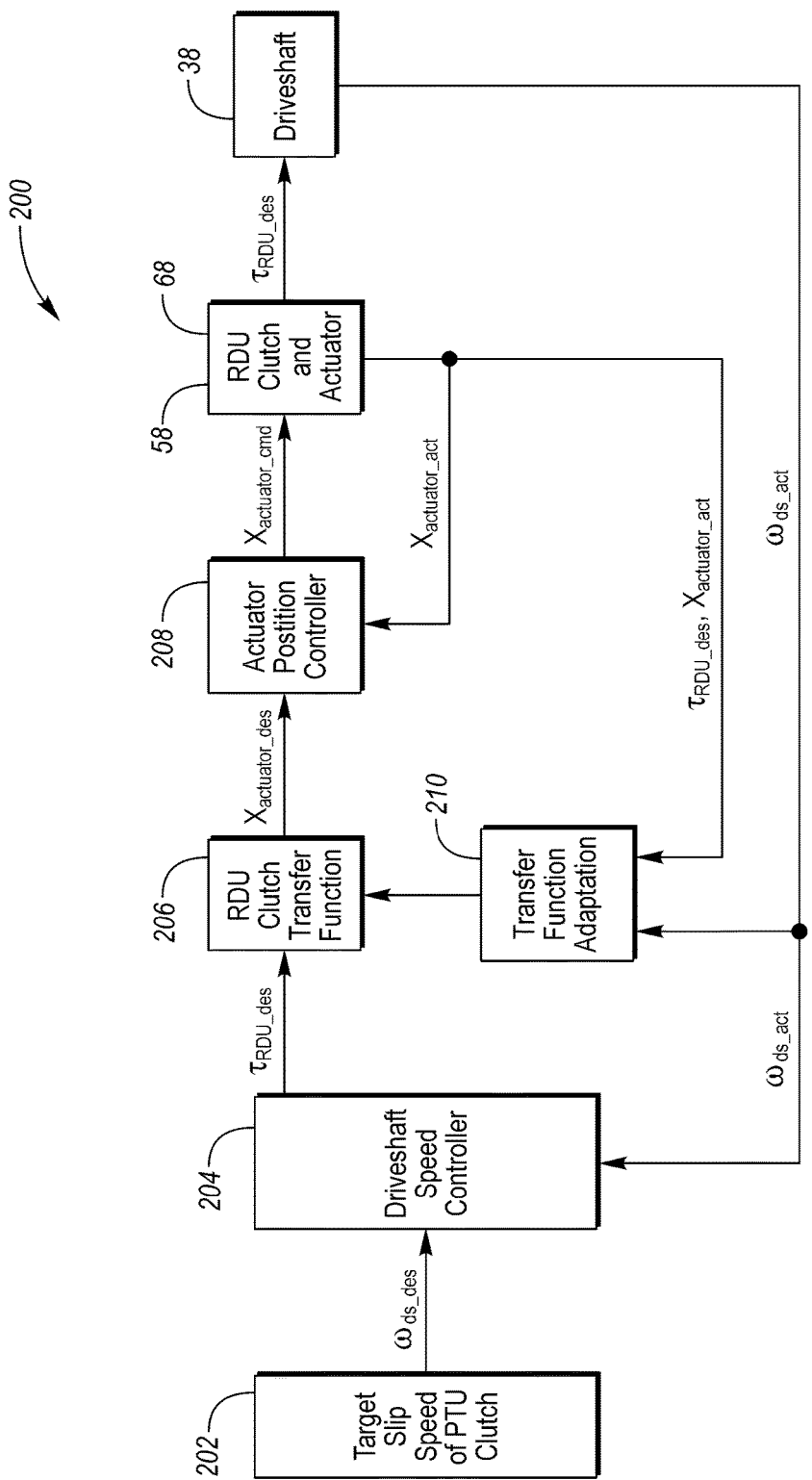
FIG. 5 is a flowchart illustrating a method of controlling the slip speed of the power transfer unit clutch.

Referring to FIG. 5, a method 200 of controlling the slip speed of the PTU clutch 34 during an engagement of the PTU clutch 34 is illustrated. The slip speed of the PTU clutch 34 may be controlled by adjusting the speed of the driveshaft 38, which is fixedly coupled to the output side of the PTU clutch 34. The speed of the driveshaft 38 may be controlled by adjusting the engagement of the RDU clutch 58. More specifically, the speed of the driveshaft 38 may be controlled by adjusting the torque of the RDU clutch 58 and/or the position of the actuator 68 of the RDU clutch 58. The engagement of the PTU clutch 34 and the RDU clutch 58 in FIG. 5 may result from a command to reconnect the driveshaft 38 to the front axle 36 and rear axle 40. The method 200 may be stored as control logic and/or an algorithm within the controller 60. The controller 60 may implement the method 200 by controlling the various components of the vehicle 10.

The method begins at block 202 where a target slip speed of the PTU clutch 34 is determined from high fidelity modeling. The target slip speed of the PTU clutch 34 is then converted into a desired speed, $\omega_{ds\_des}$, of the driveshaft 38. The desired speed, $\omega_{ds\_des}$, of the driveshaft 38 may be based on obtaining a desired speed of the output side of the PTU clutch 34 that correlates with the current speed of the input side of the PTU clutch 34 in order to obtain the target slip speed of the PTU clutch 34. The desired speed, $\omega_{ds\_des}$, of the driveshaft 38 is then commanded to a driveshaft speed controller 204. The driveshaft speed controller 204 outputs a desired torque, $\tau_{RDU\_des}$, of the RDU clutch 58 based on a difference between the desired speed, $\omega_{ds\_des}$, of the driveshaft 38 and a measured or actual speed, $\omega_{ds\_des}$, of the driveshaft 38. The actual speed, $\omega_{ds\_act}$, of the driveshaft 38 is communicated to the driveshaft speed controller 204 through a feedback loop from the driveshaft 38. The actual speed, $\omega_{ds\_act}$, of the driveshaft 38 and the desired speed, $\omega_{ds\_act}$, of the driveshaft 38 may be correlated with or be converted into actual (or measured) and desired output speeds of the PTU clutch 34, respectively. The conversion of the driveshaft speeds into output speeds of the PTU clutch 34 may involve a multiplication of any existing gear ratios between the driveshaft 38 and the output of the PTU clutch 34. The actual and desired output speeds of the PTU clutch 34 may then be converted into actual and desired slip speeds of the PTU clutch 34 when compared to the current input speed of the PTU clutch 34. The actual speed, $\omega_{ds\_act}$, of the driveshaft 38 may be communicated to the driveshaft speed controller 204 via speed sensors, as described above.

The desired torque, $\tau_{RDU\_des}$, of the RDU clutch 58 is input from the driveshaft speed controller 204 into an RDU clutch transfer function at block 206. The RDU clutch transfer function converts the desired torque, $\tau_{RDU\_des}$, of the RDU clutch 58 into a desired position, $X_{actuator\_des}$, of the actuator 68 of the RDU clutch 58. More specifically, the desired position, $X_{actuator\_des}$, of the actuator 68 may be the desired position of the mechanism 82 of the actuator 68 that produces linear movement in order to engage the piston 80 with the clutch pack in the RDU clutch 58. The desired position, $X_{actuator\_des}$, of the actuator 68 is input into an actuator position controller 208. The actuator position controller 208 outputs a commanded position, $X_{actuator\_cmd}$, to the actuator 68 based on a difference between the desired position, $X_{actuator\_des}$, of the actuator 68 and a measured or actual position, $X_{actuator\_act}$, of the actuator 68. More specifically, the commanded position, $X_{actuator\_cmd}$, of the actuator 68 may be a commanded position of the mechanism 82 of the actuator 68 while the actual position, $X_{actuator\_act}$, of the actuator 68 may be an actual position of the mechanism 82 of the actuator 68. The actual position, $X_{actuator\_act}$, of the actuator 68 is communicated to the actuator position controller 208 through a feedback loop from the actuator 68. The actual position, $X_{actuator\_act}$, of the actuator 68 may be communicated to the actuator position controller 208 via a position sensor, which may detect current linear position of the actuator mechanism 82, or may be communicated to the actuator position controller 208 based on the rotational position of an electric motor in the case where the actuator 68 is an electric motor. The RDU clutch 58 then applies a torque to the driveshaft 38 that correlates with the desired torque, $\tau_{RDU\_des}$ of RDU clutch 58.

The RDU clutch transfer function 206 may be adjusted by an adaptive algorithm 210 that maps the relationships between the torque of the RDU clutch 58 and the position of the actuator 68 of the RDU clutch 58. The adaptive algorithm 210 maps the relationships between the torque of the RDU clutch 58 and the position of the actuator 68 based on data from prior reconnections of the driveshaft 38 to the rear axle 40 and front axle 36 via the RDU clutch 58 and PTU clutch 34, respectively. Inputs to the adaptive algorithm 210 may include desired torques, $\tau_{RDU\_des}$, of the RDU clutch 58, actual positions, $X_{actuator\_act}$, of the actuator 68, and actual speeds, $\omega_{ds\_act}$, of the driveshaft 38 from prior reconnections of the driveshaft 38 that resulted in obtaining the desired slip speed of the PTU clutch 34. The adaptive algorithm 210 updates the RDU clutch transfer function to update the desired position, $X_{actuator\_des}$, of the actuator 68, commanded position, $X_{actuator\_cmd}$, of the actuator 68, and desired torque, $\tau_{RDU\_des}$, of the RDU clutch 58 during future reconnections of the driveshaft 38 to the front axle 36 and rear axle 40. It should be understood that the flowchart in FIG. 5 is for illustrative purposes only and that the method 200 should not be construed as limited to the flowchart in FIG. 5. Some of the steps of the method 200 may be rearranged while others may be omitted entirely.

Alternative adaptation strategies, mechanisms or algorithms may be used to adjust the desired position, $X_{actuator\_des}$, of the actuator 68, commanded position, $X_{actuator\_cmd}$, of the actuator 68, and desired torque, $\tau_{RDU\_des}$, of the RDU clutch 58 during future reconnections of the driveshaft 38 to the front axle 36 and rear axle 40. A first alternative adaptation strategy may include populating torque values of the RDU clutch 58 at the touch or kiss point of the RDU clutch 58 reported from the RDU clutch 58 clutch and/or actuator 68 vendor's actuator and clutch engagement control strategy. This strategy may be applied during a calibrated number of RDU clutch 58 engagements if the data from prior RDU clutch 58 connections is limited (i.e., the keep-alive memory of the controller 60 is green or limited due to a limited number of RDU clutch 58 engagements stored in the memory). The keep-alive memory may be green if the vehicle is new, the controller 60 has been reset, the RDU clutch 58 has been replaced, other powertrain components have been replaced, etc. The obtained kiss point torque of the RDU clutch 58 is used in addition to the kiss point position of the actuator 68 to modify commanded position, $X_{actuator\_cmd}$, of the actuator 68 in order to obtain the desired torque, $\tau_{RDU\_des}$, of the RDU clutch 58. Since the torque is not measured and no estimator cannot be implemented due to lack of feedback variable, the strategy assumes the overall transfer function 206 is correct and that the kiss point torque is correct when the closed-loop controller output (i.e., the actual position, $X_{actuator\_act}$, of the actuator 68) is below a calibrated threshold at the instant when the actual speed, $\omega_{ds\_act}$, of the driveshaft 38 reaches desired speed, $\omega_{ds\_des}$.

A second alternative adaptation strategy may be applied once the torque values of the RDU clutch 58 at the touch or kiss point of the RDU clutch 58 have been populated in the first alternative adaptation strategy. The second adaption strategy may include an adaptation of a feed-forward table that supplies a feed-forward command, that represents the driveline steady-state friction at the current RDU clutch 58 temperature and desired speed, $\omega_{ds\_act}$, of the driveshaft 38, into a controller than outputs the commanded position, $X_{actuator\_cmd}$, of the actuator 68. Alternatively, the feed-forward command may represent the desired torque, $\tau_{RDU\_des}$, of the RDU clutch 58. Adaptation of this table is triggered when the actual speed, $\omega_{ds\_act}$, of the driveshaft 38 has reached the desired speed, $\omega_{ds\_act}$, and one of the feed-back terms of the controller (i.e., the actual position, $X_{actuator\_act}$, of the actuator 68) is larger than a calibrated threshold. The table points of the region (representing either the driveline steady-state friction or the desired torque, $\tau_{RDU\_des}$, of the RDU clutch 58) associated with the operating conditions (i.e., the current RDU clutch 58 temperature and the desired speed, $\omega_{ds\_act}$, of the driveshaft 38) are adapted in order to minimize the difference between the controller output (i.e., the desired position, $X_{actuator\_des}$, of the actuator 68) and table output (i.e., the commanded position, $X_{actuator\_cmd}$, of the actuator 68) at current operating points by assuming that the current controller output corresponds to the driveline steady-state torque. The table points are may be adapted by using a recursive least squares algorithm with a covariance matrix based on the maturity of the table points.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a driveshaft selectively coupled to outputs of first and second axles by first and second clutches, respectively; and
   a controller programmed to, in response to a command to reconnect the driveshaft to the outputs of the first and second axles, close the second clutch to transfer loads from the second axle to the driveshaft, adjust a slip speed of the first clutch to within a target range, and close the first clutch.

2. The vehicle of claim 1, wherein the controller adjusts the slip speed of the first clutch by adjusting torque of the second clutch.

3. The vehicle of claim 2, wherein torque of the second clutch is adjusted based on a difference between a desired slip speed of the first clutch and a measured slip speed of the first clutch.

4. The vehicle of claim 3, wherein the controller is programmed to adjust the torque of the second clutch based on data from prior reconnections of the driveshaft to the first and second axles, the data based on an adaptive algorithm that maps a relationship between torque values of the second clutch and an actuator position of the second clutch.

5. The vehicle of claim 1, wherein the slip speed of the first clutch is adjusted by adjusting a position of an actuator of the second clutch.

6. The vehicle of claim 5, wherein the position of the actuator of the second clutch is adjusted based on a difference between a desired slip speed of the first clutch and a measured slip speed of the first clutch.

7. The vehicle of claim 6, wherein the controller is programmed to adjust the position of the actuator of the second clutch based on data from prior reconnections of the driveshaft to the first and second axles, the data based on an adaptive algorithm that maps a relationship between the positions of the actuator of the second clutch and a torque of the second clutch.

8. The vehicle of claim 1, wherein a target range of slip speed is based on simulated data that correlates with minimum engagement times.

9. A vehicle comprising:
   a first axle having a first differential and first clutch, the first differential including first and second output shafts each coupled to one of a pair of first wheels;
   a second axle having a second differential that includes third and fourth output shafts each coupled to one of a pair of second wheels, and a second clutch configured to decouple one of the pair of second wheels from the fourth output shaft when in an open position;
   a driveshaft selectively coupled to a carrier of the first differential by the first clutch and coupled to a carrier of the second differential via a fixed gearing arrangement; and
   a controller programmed to, in response to a command to connect the first axle to the second axle via the driveshaft, close the second clutch to transfer loads from the second axle to the driveshaft, adjust a slip speed of the first clutch to within a target range, and close the first clutch.

10. The vehicle of claim 9, wherein the controller adjusts the slip speed of the first clutch by adjusting torque of the second clutch.

11. The vehicle of claim 10, wherein torque of the second clutch is adjusted based on a difference between a desired slip speed of the first clutch and a measured slip speed of the first clutch.

12. The vehicle of claim 11, wherein the controller is programmed to adjust the torque of the second clutch based on data from prior reconnections of the driveshaft to the first and second axles, the data based on an adaptive algorithm that maps a relationship between torque values of the second clutch and an actuator position of the second clutch.

13. The vehicle of claim 9, wherein the slip speed of the first clutch is adjusted by adjusting a position of an actuator of the second clutch.

14. The vehicle of claim 13, wherein the position of the actuator of the second clutch is adjusted based on a difference between a desired slip speed of the first clutch and a measured slip speed of the first clutch.

15. The vehicle of claim 14, wherein the controller is programmed to adjust the position of the actuator of the second clutch based on data from prior reconnections of the driveshaft to the first and second axles, the data based on an adaptive algorithm that maps a relationship between the positions of the actuator of the second clutch and a torque of the second clutch.

16. The vehicle of claim 9, wherein a target range of slip speeds includes a set of non-zero slip speeds.

17. A method comprising:
   in response to a command to connect an input of a first axle to an output of a second axle via a driveshaft,
      closing a first clutch to couple a traction wheel to an output of the first axle,
      adjusting a slip speed of a second clutch disposed between the driveshaft and output of the second axle to within a target range, and
      closing the second clutch.

18. The method of claim 17, wherein the slip speed of the second clutch is adjusted by adjusting a position of an actuator of the first clutch.

19. The method of claim 18, wherein the position of the actuator of the first clutch is adjusted based on a difference between a desired slip speed of the second clutch and a measured slip speed of the second clutch.

20. The method of claim 17, further comprising obtaining a target range of slip speeds via computer simulations.

* * * * *